(12) United States Patent
Tasaki et al.

(10) Patent No.: US 9,239,176 B2
(45) Date of Patent: Jan. 19, 2016

(54) MAGNETIC HEATING AND COOLING DEVICE

(75) Inventors: Yutaka Tasaki, Yokohama (JP); Yoshio Utaka, Yokohama (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 187 days.

(21) Appl. No.: 14/117,967

(22) PCT Filed: May 17, 2012

(86) PCT No.: PCT/JP2012/062674
§ 371 (c)(1),
(2), (4) Date: Dec. 12, 2013

(87) PCT Pub. No.: WO2012/157708
PCT Pub. Date: Nov. 22, 2012

(65) Prior Publication Data
US 2014/0109597 A1  Apr. 24, 2014

(30) Foreign Application Priority Data

May 17, 2011 (JP) ................................. 2011-110885

(51) Int. Cl.
*F25B 21/00* (2006.01)

(52) U.S. Cl.
CPC ........... *F25B 21/00* (2013.01); *F25B 2321/002* (2013.01); *Y02B 30/66* (2013.01)

(58) Field of Classification Search
CPC .... F25B 21/00; F25B 2321/002; F25B 21/02; F25B 2321/0023; Y02B 30/66
USPC .......................................................... 62/3.1
See application file for complete search history.

(56) References Cited

U.S. PATENT DOCUMENTS

| 6,131,644 | A |  | 10/2000 | Kohara et al. |
| 8,087,455 | B2 | * | 1/2012 | Miao et al. ..................... 165/167 |
| 8,104,340 | B2 | * | 1/2012 | Speldrich ...................... 73/202.5 |
| 2005/0082049 | A1 | * | 4/2005 | Brost ............................ 165/166 |
| 2007/0125095 | A1 |  | 6/2007 | Iwasaki et al. |

(Continued)

FOREIGN PATENT DOCUMENTS

| JP | 63197886 A | 8/1988 |
| JP | 10-185339 A | 7/1998 |

(Continued)

OTHER PUBLICATIONS

The Extended European Search Report dated Oct. 9, 2014 from the corresponding European Patent Application No. 12786643.2.

*Primary Examiner* — Mohammad M Ali
(74) *Attorney, Agent, or Firm* — Young Basile

(57) ABSTRACT

A magnetic heating and cooling device is provided that comprises a heat exchanger that includes a magnetic body having a magnetocaloric effect; a magnetic field applying and removing unit that selectively applies to or removes from the magnetic body a magnetic field; and a liquid refrigerant moving unit that reciprocates a liquid refrigerant from one end to the other end, or from the other end to the one end, of the heat exchanger to exchange heat with the magnetic body inside the heat exchanger. The magnetic body is constituted by a plurality of flat magnetic members. At least one flat magnetic member has at least one slit that opens in the direction perpendicular to the movement direction of the liquid refrigerant, and the open end of each slit forms a corner to increase heat exchange efficiency.

6 Claims, 8 Drawing Sheets

(56) References Cited

U.S. PATENT DOCUMENTS

| | | |
|---|---|---|
| 2008/0002001 A1* | 1/2008 | Enomoto et al. ............... 347/71 |
| 2008/0236172 A1 | 10/2008 | Muller et al. |
| 2009/0113897 A1 | 5/2009 | Dinesen et al. |
| 2009/0157001 A1* | 6/2009 | Jones et al. .................. 604/118 |
| 2009/0320499 A1 | 12/2009 | Muller et al. |
| 2011/0048031 A1 | 3/2011 | Barve et al. |

FOREIGN PATENT DOCUMENTS

| | | |
|---|---|---|
| JP | 11-281273 A | 10/1999 |
| JP | 2007-155237 A | 6/2007 |
| JP | 2008-527301 A | 7/2008 |
| JP | 2010-025435 A | 2/2010 |
| WO | 2010-034907 A1 | 4/2010 |
| WO | 2012-056585 A1 | 5/2012 |

* cited by examiner

FIG. 4A
FIG. 4B
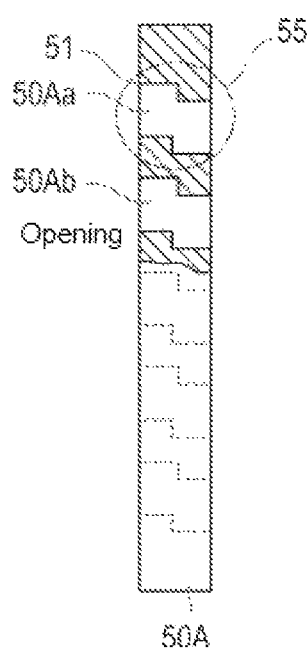
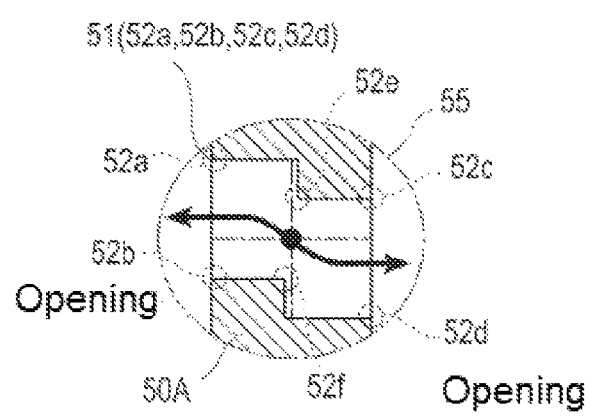

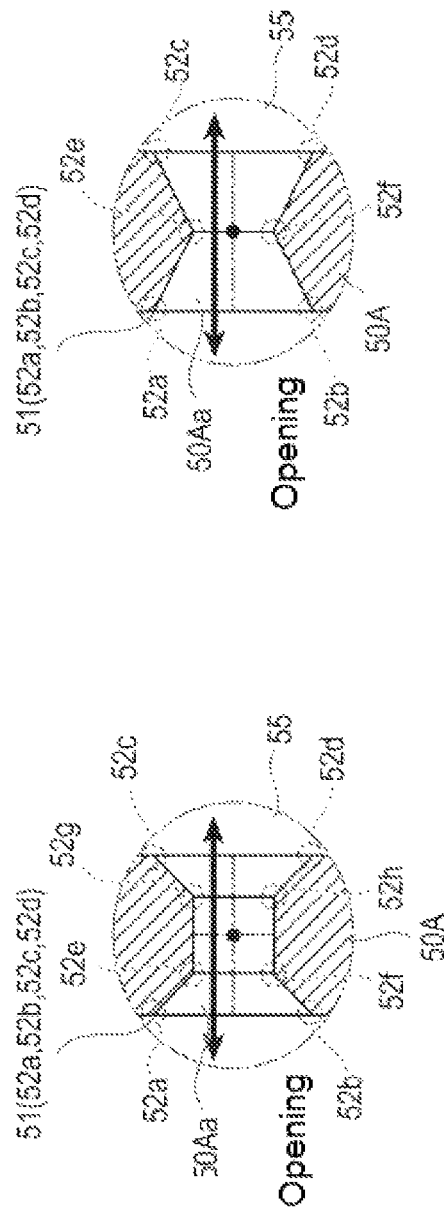

MAGNETIC HEATING AND COOLING DEVICE

CROSS-REFERENCE TO RELATED APPLICATION

This national stage application claims priority to Japanese Patent Application No. 2011-110885 filed on May 17, 2011, which is incorporated herein in its entirety.

TECHNICAL FIELD

The invention relates to a magnetic heating and cooling or air conditioning device, and especially relates to a magnetic heating and cooling device that may improve the heat exchange efficiency between a magnetic body with a magneto-caloric effect and a liquid refrigerant in contact with the magnetic body.

BACKGROUND

Conventionally, the majority of the heating and cooling or air conditioning devices operating in room temperature range such as refrigerators, freezers, and air conditioners take advantage of the thermal conductivity of a gas refrigerant like chlorofluorocarbon (CFC) and alternative chlorofluorocarbon gas. More recently, the problem of ozone depletion caused by the discharge of Freon gas is known, and further, the effects of global warming due to discharge of alternative Freon is also a concern. Therefore, the development of an air conditioning device which is clean and innovative with high heat transfer capacity is strongly desired as an alternative to the refrigerator using the gaseous refrigerant and causing the high environmental loads due to use of CFC or alternative for CFC.

Against this background, air conditioning technology that is now attracting attention recently is a magnetic heating and cooling technology. Some of the magnetic material exhibits, when the magnitude of the magnetic field applied to the magnetic body is changed, vary temperature of itself in response to that change, through so-called magneto-caloric effect. The magnetic conditioning device technology is directed to such technology for transporting heat by using a magnetic material expressing the magneto-caloric effect.

For refrigerator utilizing gaseous refrigerant, it is necessary to use a gas refrigerant of large environmental load in order to establish a refrigeration cycle. Moreover, a step of compressing the gaseous refrigerant is required. However, in the case of a magnetic refrigerator utilizing a magnetocaloric effect, it is sufficient to use a liquid refrigerant (usually water or water plus alcohol) with low environmental hazard in order to establish a magnetic refrigeration cycle and to move the liquid refrigerant two-way, i.e. between a high and low temperature sides.

In this way, the magnetic refrigerator is attracting attention as a refrigerator for the next generation because it does not only cause problems of ozone layer depletion and global warming but also has high energy efficiency.

In the magnetic refrigeration technology that targets the room temperature region, for example, an AMR (Active-Magnetic Regenerative Refrigeration) method as described in International Publication No. WO2010/034 907 is known. The AMR method is a magnetic refrigeration technology that not only uses a magnetic material as the magnetic refrigeration material to exhibit the magnetocaloric effect in the magnetic material but also exhibits a regenerative effect of storing heat generated by the magnetic material.

In order to combine the magnetocaloric effect and regenerative effect to thereby produce a favorable temperature gradient for the heat transport throughout a magnetic refrigeration material in the AMR method, the thermal conductivity of the magnetic refrigeration material is controlled.

However, there is room for improvement in enhancement of heat exchange efficiency in the magnetic refrigerator having high energy efficiency.

In the case of the conventional magnetic refrigerator, a plurality of magnetic bodies of the flat plate are laminated on one another with a gap interposed there between and a liquid refrigerant is passed through in the gap to be subjected to heat exchange between the magnetic body and the liquid refrigerant. Heat exchange efficiency between the magnetic material and liquid refrigerant can be improved by exploring for a high frequency of the reciprocating movement of the liquid refrigerant, specifically through the optimization of its reciprocating distance and period. However, there is a limit on the improvement in the heat exchange efficiency only through high frequency by optimizing the distance or period.

BRIEF SUMMARY

Accordingly, the inventors of the present invention focus on the leading edge effect at which high heat transfer coefficient is available due to the thickness of the thermal boundary layer becoming thinner when a flat plate is placed in the flow field. By actively taking advantage of the leading edge effect, it is possible to proceed with the higher frequency to thereby obtain higher heat exchange efficiency along with the higher frequencies.

The present invention aims to provide a magnetic heating and cooling or conditioning device with improved heat exchange efficiency between the magnetic body and the liquid refrigerant in contact with the magnetic body by using a magnetic material of a structure that can use the leading edge effects.

The magnetic heating and cooling, conditioning device according to the present invention to achieve the above objective is provided with a heat exchanger, a magnetic field application and removal unit and a liquid refrigerant moving or displacing unit. In the heat exchanger, a magnetic body producing a magnetocaloric effect is disposed. The magnetic field application and removal unit selectively applies or removes a magnetic field on the magnetic body. The liquid refrigerant moving unit moves to reciprocate the liquid refrigerant from one end of the heat exchanger to the other end, and from the other end to the one end so as to conduct a heat exchange with the magnetic body within the heat exchanger. The magnetic body is configured or constructed by at least one flat plate magnetic body and has at least one passage that opens in a direction orthogonal or perpendicular to the moving direction of the liquid refrigerant. The open end of the passage is configured to form a sharp corner.

According to the magnetic cooling and heating, or conditioning device pertaining to the present invention constructed above, since at least one passage is opened in the flat plate magnetic body and the open end of the passage is formed by a sharp corner, the leading edge effect may be used actively to thereby obtain higher heat exchange efficiency. In addition, since the heat exchange efficiency of each flat plate magnetic body is enhanced, as compared to the conventional structure, the magnetic body may be formed by multiple flat plate magnetic member.

Therefore, if the heat transfer capacity is the same, it is possible to downsize and reduce the weight of the magnetic air-conditioning device.

BRIEF DESCRIPTION OF THE DRAWINGS

The description herein makes reference to the accompanying drawings wherein like reference numerals refer to like parts throughout the several views, and wherein:

FIG. 4A is an internal structure view of a slit which is opened in the flat magnetic body;

FIG. 4B is an exploded view of the slit of FIG. 4A;

FIG. 5A is an internal structural view illustrating another embodiment of the slit which is opened in the flat magnetic body;

FIG. 5B is an exploded view of the slit of FIG. 5A;

DETAILED DESCRIPTION

In the following, embodiments of a magnetic cooling and heating or conditioning device according to the present invention are described in detail by dividing from a "first embodiment" to "a fourth embodiment." First, description is made in detail of the overall configuration and the operation of the magnetic conditioning with reference to the drawings.

Figure 1:
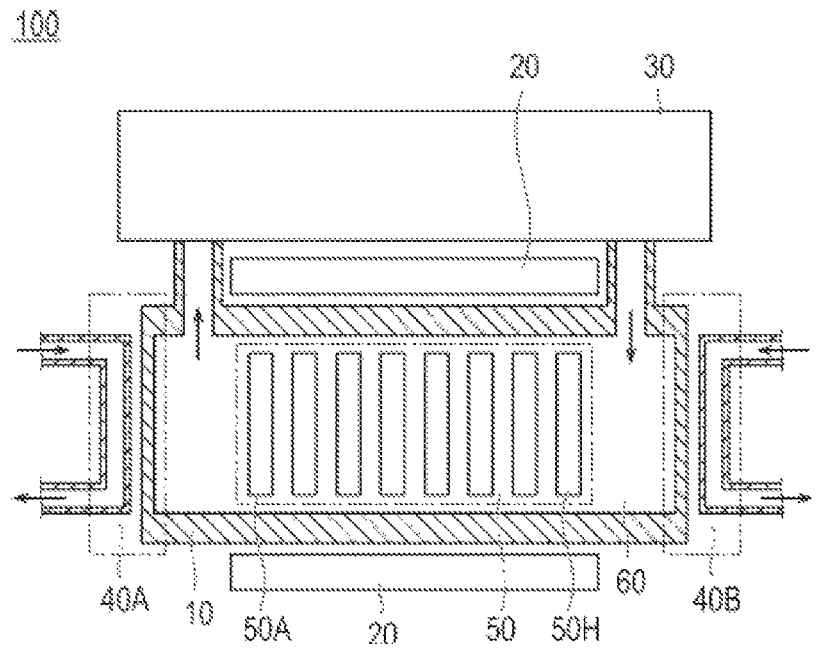
FIG. 1 is an overall configuration diagram of a magnetic cooling and heating device according to the present invention.

FIG. 1 is an overall configuration diagram of a magnetic conditioning device according to the present invention. The magnetic conditioning device 100 includes a heat exchanger 10, the magnetic field applying and removing unit 20, a liquid refrigerant moving unit 30, a high-temperature-side heat exchanger 40A, and a low-temperature-side heat exchanger 40B, as shown in FIG. 1. Inside the heat exchanger 10, a magnetic body 50 having a magnetocaloric effect is disposed and a liquid refrigerant 60 for performing heat exchange with the magnetic body 50 is filled.

The heat exchanger 10 is provided with, at its one end, a high-temperature side heat exchange unit 40A and, at the other end, a low-temperature side heat exchange unit 40B. The high-temperature side heat exchanger 40A and the low-temperature side heat exchanger 40B are connected to an external heat exchanger (not shown), respectively.

The magnetic field applying and removing unit 20 selectively applies on and removes from the magnetic bod inside the heat exchanger 10 a magnetic field. The magnetic body in turn generates when the magnetic field is applied by the magnetic field applying and removing unit 20 while absorb heat when the magnetic field is removed by the magnetic field applying and removing unit 20.

The liquid refrigerant moving section 30 is connected to the heat exchanger 10 and, in order to exchange heat with the magnetic body inside the heat exchanger 10, is configured to move the liquid refrigerant from one end of the heat exchanger to the other end thereof, and from the other end to the one end for reciprocal movement or displacement at a constant period and amplitude.

The magnetic body 50 is composed of a plurality of flat magnetic bodies 50A . . . 50H arranged in upright in a direction perpendicular to the moving direction of the liquid refrigerant 60. The flat magnetic body 50A . . . 50H has a flow passage in the form of a plurality of slit (described below) which are open in the direction perpendicular to the moving direction of the liquid refrigerant 60. The liquid coolant or refrigerant 60 is distributed through the slit to absorb heat of the flat magnetic body 50A . . . 50H and to radiate heat of the liquid refrigerant to flat magnetic body 50A . . . 50H. Note that, although in the present embodiment eight flat magnetic bodies 50A . . . 50H are illustrated to facilitate understanding of the present invention in this embodiment, the number of pieces of flat magnetic bodies radiated to the flat magnetic body 50A . . . 50H may differ from the heat transfer capacity required for the magnetic conditioning device 100. Thus, the magnetic body 50 is constructed by at least one flat magnetic body.

The magnetic cooling and heating device structured above operates in the following manner.

First, when a magnetic field is applied to the magnetic body 50 by the magnetic field applying and removing unit 20, the magnetic body 50 generates heat and the temperature of the magnetic body 50 is increased.

Next, the liquid refrigerant moving unit 30 moves the liquid refrigerant 60 for the other end to one end of the heat exchanger 10, i.e. from the low-temperature side heat exchange portion 40B toward the high-temperature side heat exchange portion 40A. Consequently, the temperature of the liquid refrigerant 60 located at the one end of the heat exchanger 10, i.e, the temperature of the liquid refrigerant 60 positioned at the side of the high-temperature side heat exchanger 40A is higher.

Then, upon a magnetic field being removed from the magnetic body 50 by the magnetic field applying and removing unit 20, the magnetic body 50 absorbs heat and the temperature of the magnetic body 50 decreases. Then, the liquid refrigerant moving unit 30 causes the liquid refrigerant within the heat exchanger 10 from the one end to the other end of the heat exchanger 10, i.e., in an direction opposite from the above and from the high-temperature side heat exchanger portion 40A to the low-temperature side heat exchange portion 40B. Due to the movement of the liquid refrigerant 60, a heat exchange takes place with the magnetic body 50. Consequently, the temperature of the liquid refrigerant 60 that is located on the side of the low-temperature side heat exchange portion 40B will be lower.

By repeating to continue the operation described above, the temperature on the high-temperature side heat exchange portion 40A is higher than the temperature on the low-temperature side heat exchange portion 40B positioned at the other side of the heat exchanger 10 on a steady basis. In this state, it is possible to obtain a high temperature liquid refrigerant when heat exchange is performed with the liquid refrigerant passing through the heat exchange portion 40A while, when heat exchange with the liquid refrigerant passing through the low-temperature heat exchange portion 40B, a low temperature liquid refrigerant may be available.

In the magnetic air conditioning apparatus 100 according to the present invention, in order to allow an efficient heat exchange with the liquid refrigerant, each piece of the flat magnetic body 50A . . . 50H is formed in a structure to actively use a leading edge effect described below.

Figure 2:
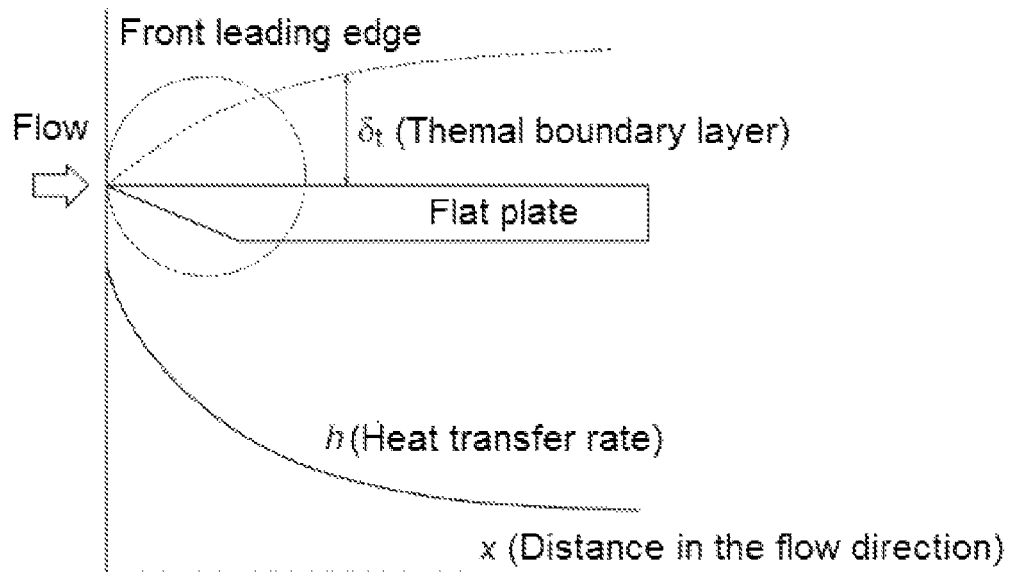
FIG. 2 is a diagram for explaining a leading edge effect.

FIG. 2 is a diagram for explaining the leading edge effect. As can be seen, when placing a flat plate parallel to the flow direction of the liquid refrigerant 60, the heat transfer coefficient h of the leading edge of the flat plate facing the flow direction (shown in solid line) is maximized. The distance x is larger in the direction of flow from the leading edge portion, the heat transfer coefficient of a flat plate is smaller with the thermal boundary layer thickness of δt (shown dotted) being increased. The leading edge effect is explained by the effect by which the effective heat transfer coefficient is higher in accordance with a thin thermal boundary layer at the leading edge when the flat plate is in a flow field.

In order to actively use the leading edge effect in the magnetic conditioning device 100 according to the present invention, as shown in FIG. 1, a plurality of pieces or members of the flat magnetic body 50A . . . 50H constituting the magnetic body 50 are configured to be arranged in an upright position with respect the moving direction of the liquid refrigerant 60. Further, each of the plurality of the flat magnetic pieces or members 50A . . . 50H has a plurality of slits opened in a direction perpendicular to the moving direction of the liquid refrigerant 60.

Figure 3:
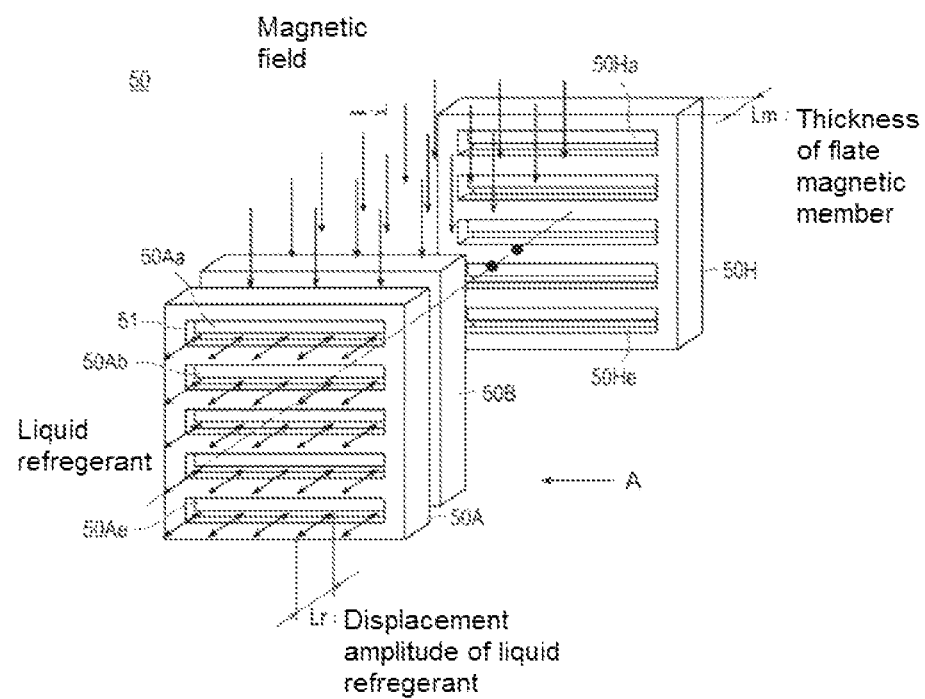
FIG. 3 is a block diagram of a magnetic material provided in the magnetic cooling and heating device in a first embodiment.

FIG. 3 is a configuration diagram of a magnetic body provided in the magnetic conditioning device in the first embodiment. As shown, each of the flat magnetic pieces 50A . . . 50H are provided with a plurality of slits which open in a direction perpendicular to the moving direction of the liquid refrigerant 60 shown by arrow. Further, the slits shown are opened in a direction perpendicular to the direction of the magnetic field applied by the magnetic field applying and removing unit 20.

Five rectangular slits 50Aa . . . 50Ae are opened in the flat magnetic body 50A. Further, five rectangular slits 50Ha . . . 50He are opened in the flat magnetic body 50H. Six flat magnetic members (see FIG. 1) positioned between the flat magnetic member 50A and the flat magnetic member 50H are likewise provided with five rectangular slits with openings. The slits form a flow passage of the liquid refrigerant 60.

Each open end 51 of the slits opened in the plurality of flat magnetic members 50A . . . 50H constituting the magnetic body 50 has a sharp corner so as to effectively obtain the leading edge effect described above. It should be noted that the sharp corner is intended to describe a part of the ridge at which a crossing angle formed by a surface extending in a direction perpendicular to the direction of flow of the liquid refrigerant 60 and an inner surface of the slit 50Aa expanding parallel to the direction of flow of the liquid refrigerant is about 90 degrees.

Since the open end 51 represents a part that is pointed to face the flow direction of the liquid refrigerant 60, open end 51 forms a leading edge as shown in FIG. 2. Therefore, the heat transfer coefficient with the liquid refrigerant 60 is improved in the open end 51 of all the slits opened in the flat magnetic body 50A . . . 50H, and the heat exchange efficiency from the magnetic body 50 to the liquid refrigerant 60 is improved.

As shown in FIG. 3, it is possible to improve the heat transfer rate by simply opening a slit having a dihedral or sharp corner on the flat magnetic body 50A . . . 50H, but by forming the shape within the slip in the following manner, it is possible to improve the heat transfer coefficient further.

FIG. 4A is an internal structure view of the slit which is opened in a flat magnetic body. FIG. 4A is a view of the flat magnetic body 50A shown in FIG. 3 taken along the direction of line. FIG. 4B is an enlarged view of the opening 55 of FIG. 4A.

As shown in FIG. 4A, rather than penetrating straight the flat magnetic body 50A, the internal structure of the slits 50Aa, 50Ab has a stepped structure with a step. By forming the internal of the slits 50Aa, 50Ab as a step structure with a stair-step, the flow rate slows down due to increased flow resistance of liquid refrigerant 60 flowing through the slit 50Aa, 50Ab.

As shown in FIG. 4B, since the opening 55 has a step structure, when viewed from the arrow A direction in FIG. 3, in the slit 50Aa, six dihedral or corners are present, which are pointed to the flow direction of the liquid refrigerant 60. The dihedral 52a, 52b, 52c, and 52d are formed in the open end 51 of the slit 50Aa, while the dihedral or corner 52e, 52f are formed in the step portion inside of the slit 50Aa.

Thus, it is possible to increase the number of parts which may use the leading edge effect in the slit 50Aa to thereby further improve the heat transfer coefficient. The forms of the opening 55 can be considered in addition to this as described below.

FIG. 5 is an internal structure showing another form or shape of the slit which is opened in a flat magnetic body. FIG. 5A shows a slit 50Aa on which eight dihedrals or corners are formed, FIG. 5B shows the slit 50Aa on which six dihedrals or corners are formed similarly to FIG. 4B.

The slit 50Aa shown in FIG. 5A is a mixed structure and has both a portion narrowed in the flow direction of the liquid refrigerant 60 and a straight portion. When the flat magnetic body 50A is viewed from the direction of arrow A (see FIGS. 3, 4A), the slot 50Aa is provided with parts pointed to the direction of flow of the liquid refrigerant, i.e. eight dihedrals or corners exist. The dihedral 52a, 52b, 52c, 52d are formed in the open end 51 of the slit 50Aa, while dihedral 52e, 52f, 52g, 52h is formed inside the slit 50Aa.

The slit 50Aa shown in FIG. 5B has a structure having a portion narrowed down to face the flow direction of the liquid refrigerant 60. When viewing from the A direction of the arrow view of the flat magnetic body 50A (FIGS. 3 and 4A), the slit 50Aa has portions which are sharp to face the flow direction of the liquid refrigerant 60, i.e. six dihedrals exist. Dihedral 52a, 52b, 52c, 52d are formed in the open end 51 of the slit 50Aa, while dihedral 52e, 52f are formed in the slit 50Aa.

Thus, it is possible to increase parts which can utilize the leading edge effect by increasing the number of dihedral of the slit 50Aa, thereby further improving the heat transfer coefficient. A variety of forms or shapes may be conceivable other that those described above as long as the leading edge may be formed. Further, with respect to the cross sectional shape along the flow of direction of the liquid refrigerant in the slits 50Aa . . . 50Ae forming a flow passage may be configured to be line symmetrical with respect to the center line in the thickness direction of the flat magnetic body 50A in the flow direction of the flat magnetic body 50A or point symmetrical with respect to the center point of the flow passage of that center line. Therefore, a pressure loss and heat exchange properties associated with reciprocating movement of the liquid refrigerant 60 becomes uniform or the same in both directions of reciprocating.

According to the magnetic air conditioning device 100 in the present embodiment configured as described above, it is possible to obtain the following effects. It is possible to use actively the leading edge effect which occurs at the leading edge of the flat magnetic body 50A . . . 50H, the heat exchange efficiency between the liquid refrigerant 60 and flat magnetic body 50A . . . 50H is improved.

In return for the improvement in the heat exchange efficiency, the magnetic conditioning device 100 may be reduced in size and weight. The heat exchange efficiency is further improved by providing a dihedral or sharp corner which makes a leading edge effect available inside the slit within 50Aa . . . 50Ae. It is possible to form the magnetic body 50 by arranging numerous flat magnetic pieces and members which are thin as compared with the conventional one because the heat exchange efficiency of each flat magnetic body 50A . . . 50H is good. Since the magnetic body 50 is composed of numerous flat magnetic pieces or members 50A . . . 50H, it is possible to improve the efficiency of heat exchange with the liquid refrigerant 60 and to improve the heat transfer capability.

Figure 6:
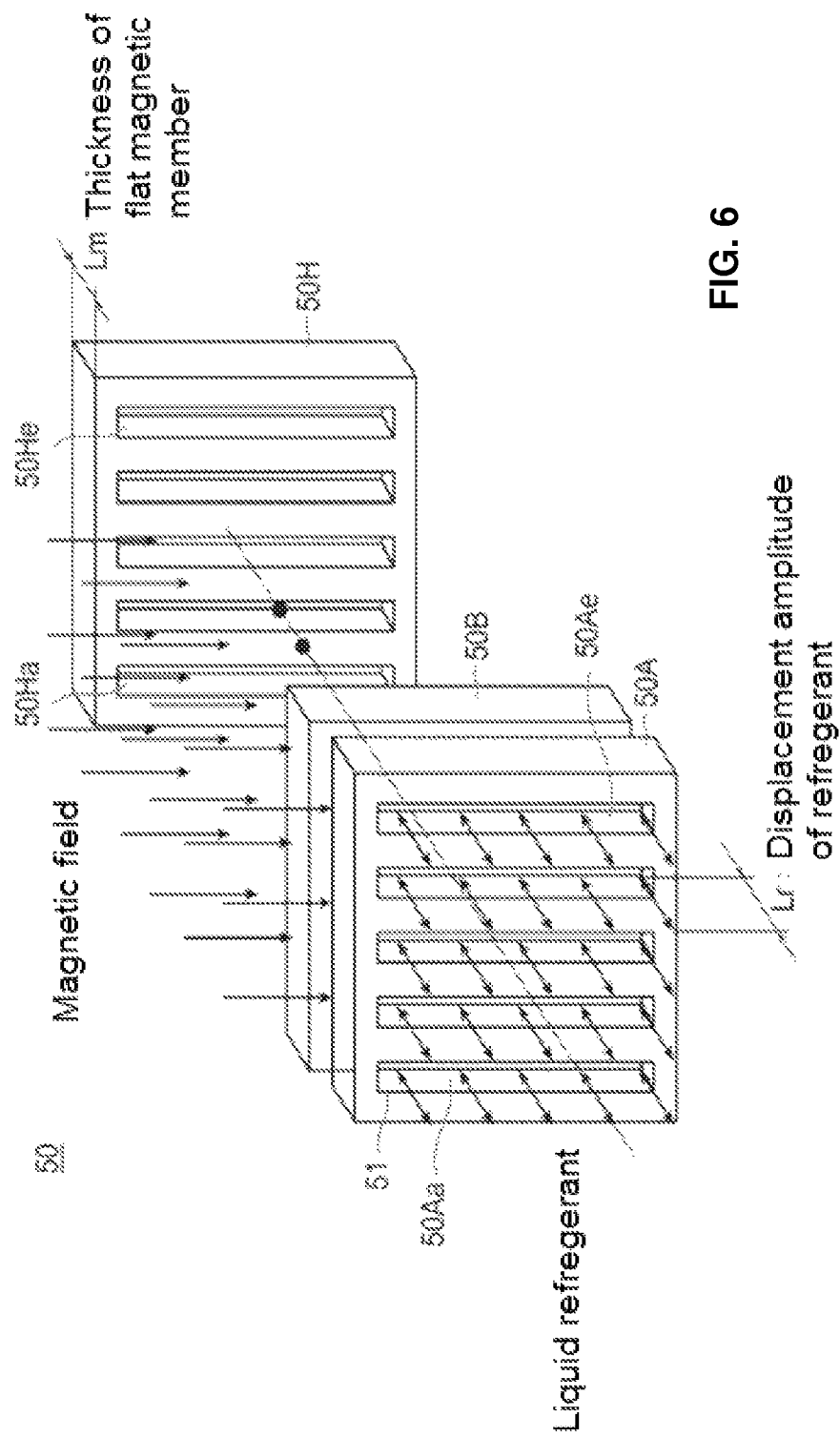
FIG. 6 is a block diagram of a magnetic material provided in the magnetic cooling and heating device in a second embodiment.

FIG. 6 shows a configuration diagram of the magnetic body provided by a magnetic conditioning device in the second embodiment. The magnetic body 50 shown is different from the magnetic body 50 shown in FIG. 3 and a plurality of slits are opened into each of the plurality of the flat magnetic pieces or members 50A . . . 50H constituting the magnetic body 50 so as to extend parallel to the direction of the magnetic field applied by the magnetic field applying and removing unit 20. In other words, the arrangement in the flat magnetic members or pieces 50A . . . 50C shown in FIG. 3 are rotated 90 degrees about the flow direction as an axis of rotation.

Incidentally, in the second embodiment, as in the first embodiment, eight flat magnetic members 50A . . . 50H are illustrated. However, depending on the heat transport capacity required for the magnetic conditioning device, the magnetic body 50 is composed by at least one flat magnetic member or piece.

As shown in FIG. 6, when arranging the flat magnetic members 50A . . . 50H in order for the longitudinal direction of the plurality of slits to extend parallel to the direction of the magnetic field applied by the magnetic field applying and removing unit 20, the magnetic lines of force from the magnetic field applying and removing unit 20 pass through more in flat magnetic body 50A . . . 50H. Therefore, it is possible to improve the magnetocaloric effect of the flat magnetic members 50A . . . 50H since the attenuation of the magnetic field is suppressed so that both the heat generation and the amount of heat absorption may be increased.

Five rectangular slits are opened in the flat magnetic body 50A in the illustrated vertical direction. In the flat magnetic body 50H as well are opened five rectangular slits 50Ha . . . 50He. Similarly, six flat magnetic pieces or members (see FIG. 1) between the flat magnetic body 50A and the flat magnetic body 50H have also openings in the longitudinal direction shown.

Each open end 51 of all the slits opened the plurality of flat magnetic members 50A . . . 50H forming the magnetic member 50 has a dihedral or sharp corner so that the leading edge effect described above is obtained effectively. The presence of the dihedral, sharp corner ensures to improve the heat exchange efficiency from the magnetic body 50 to the liquid refrigerant 60.

By forming a dihedral shaped as shown in FIGS. 4A, 4B and 5A, 5B to the slit of the plurality of flat magnetic members 50A . . . 50H constituting the magnetic body 50 shown in FIG. 6, the heat exchange efficiency is further improved.

According to the magnetic air conditioning device 100 in the present embodiment configured as described above, it is possible to obtain the following effects. It is possible to cause the magnetic force lines applied by the magnetic field applying and removing unit 20 to pass through more in the flat magnetic members 50A . . . 50H.

The energy of the magnetic field is transmitted to the flat plate magnetic members 50A . . . 50H effectively, so that the magnetocaloric effect can be utilized effectively. In addition to the same effect as the first embodiment, it is possible to suppress the attenuation of the magnetic field for the magnetic body 50 to thereby improve the heat transfer capability of the magnetic air-conditioning device 100.

Figure 7:
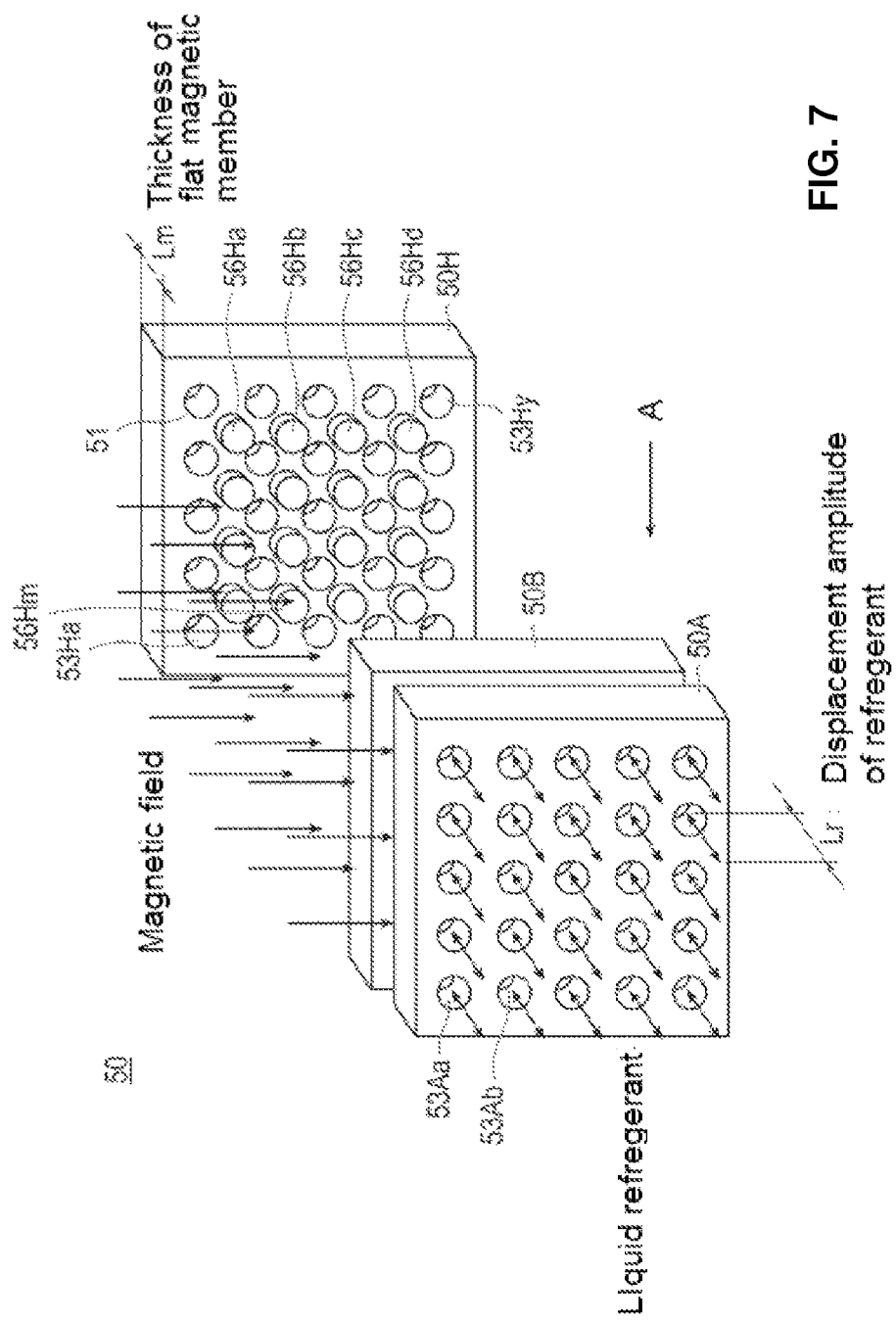
FIG. 7 is a block diagram of a magnetic material provided in the magnetic cooling and heating device in a third embodiment.

FIG. 7 is a configuration diagram of a magnetic body provided in a magnetic conditioning device in the third embodiment. In the magnetic body 50 shown in this figure, each of plurality of the flat magnetic members 50A . . . 50H is formed with a circular flow passage 53Aa . . . 53Ha . . . 53Hy for circulating the liquid refrigerant in the moving direction of the liquid refrigerant shown by arrow in the figure.

Incidentally, although eight flat magnetic members 50A . . . 50H are illustrated in the present embodiment as in the first and second embodiments, depending on the heat transport capacity required for the magnetic conditioning device 100, the magnetic body is composed of at least one flat magnetic piece or member.

Further, each of the plurality of the flat magnetic members 50A . . . 50H constituting the magnetic body 50 is formed on its front side and back side between the flow passages 53Aa . . . 53Ha . . . 53Hy. The mating part is composed of a mating projection formed on one surface of the adjacent flat magnetic members 50A . . . 50H and a mating hole formed on the opposite surface for engaging with the mating projection.

Figure 8:
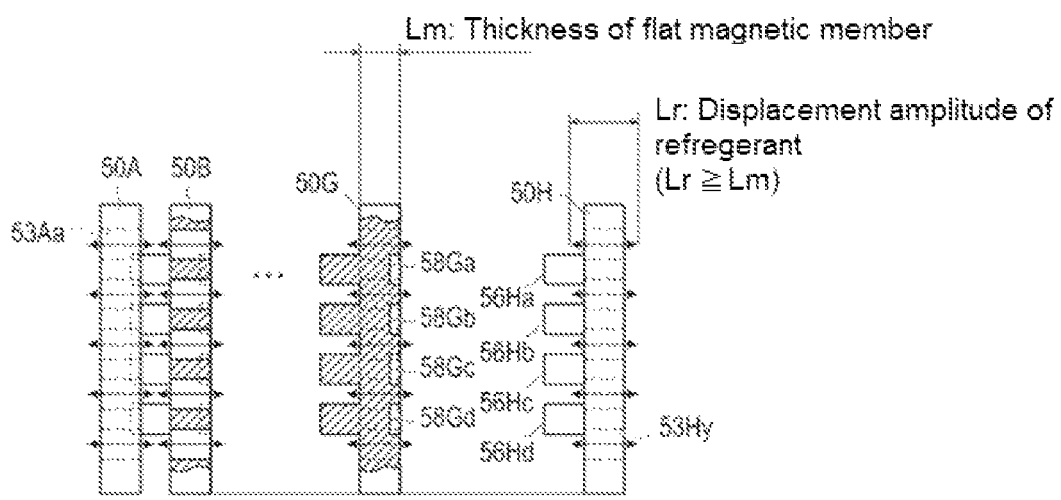
FIG. 8 is a side view from direction of arrow A of the magnetic body shown in FIG. 7.

FIG. 8 is a side view of the magnetic body 50 taken along from the direction of arrow A direction shown in FIG. 7. As shown in FIGS. 7 and 8, on the one surface of the flat magnetic member 50H, between the flow passage 53Ha . . . 53Hy, engaging projection 56Ha . . . 56Hm of circular shape are formed. On the other hand, the opposite surface of the flat magnetic member 50G adjacent to the flat magnetic material 50H, between the flow passages, mating holes 58Ga . . . 58Gd . . . are formed for mating with the engaging projections 56Ha . . . 56Hm of the flat magnetic 50H.

These engaging projections 56Ha . . . 56Hm of the flat magnetic member 50H engage with the engaging holes 58Ga . . . 58Gd of the flat magnetic member 50G of the adjacent magnetic member 50H to integrate the flat magnetic member 50H and the flat magnetic member 50G. Even at integration of the flat magnetic member 50H and the flat magnetic member 50G, a gap is formed between the flat magnetic member 50H and the flat magnetic member 50G to allow flow of the liquid refrigerant to circulate freely.

As shown in FIG. 7, by forming the flow passages 53Aa . . . 53Ha . . . 53Hy of circular shape in each of the flat magnetic members 50A . . . 50H, the open end 51 of each flow passage 53Aa . . . 53Ha . . . 53Hy will be provided with a dihedral or sharp corner to obtain the leading edge effect described above.

It should be noted that the dihedral or sharp corner is intended to describe a part of the ridge at which a crossing angle formed by a surface of the flat magnetic member 50A extending in a direction perpendicular to the direction of flow of the liquid refrigerant 60 and an inner surface of the flow passages 53Aa . . . 53Ha . . . 53Hy expanding parallel to the direction of flow of the liquid refrigerant is about 90 degrees.

Thus, since the open end 51 of the flow passage 53Aa . . . 53Ha . . . 53Hy of the flat magnetic members 50A . . . 50H of FIG. 7 is pointed opposite the flow direction of the liquid refrigerant 60, a leading edge shown in FIG. 2 is formed. Therefore, the heat transfer coefficient with the liquid refrigerant 60 is improved in the open end 51 of the flow passage 53Aa . . . 53Ha . . . 53Hy opened in the flat magnetic member 50A . . . 50H so that the heat exchange efficiency from the magnetic body 50 to the liquid refrigerant is improved.

By forming a dihedral shaped as shown in FIGS. 4A and 5A to the flow passage 53Aa . . . 53Ha . . . 53Hy of the plurality of flat magnetic members 50A . . . 50H forming the magnetic body 50 shown in FIG. 7, the heat exchanger efficiency is further improved.

According to the magnetic air conditioning device 100 in the present embodiment configured as described above, in addition to the same effect as the first embodiment, it is possible to achieve the following effects: Since multiple flow passages 53Aa . . . 53Ha . . . 53Hy are evenly distributed over the flat magnetic members 50A . . . 50H, the number of leading edge will be increased compared to the first and second embodiments, so that the heat efficiency between the flat magnetic member 50A . . . 50H and liquid refrigerant will be further improved.

By the presence of the engaging projections 56Ha . . . 56Hm, the heat transfer surface area of the flat magnetic members 50A . . . 50H to thereby improve the heat exchange efficiency.

Since multiple flow passages 53Aa . . . 53Ha . . . 53Hy are evenly distributed over the magnetic members 50A . . . 50H, the strength of the flat magnetic member 50A . . . 50H may be further enhanced compared to the first and second embodiments.

Since it is sufficient to simply insert the engaging projections to form the magnetic body 50, productivity of the magnetic body 50 is improved. Since the flat magnetic members 50A . . . 50H are formed with engaging projection 56Ha . . . 56Hm, even if the flow passages 53Aa . . . 53Ha . . . 53Hy are opened, without reducing the weight of the magnetic members 50A . . . 50H, it is possible to exert effectively the magnetocaloric effect.

Figure 9:
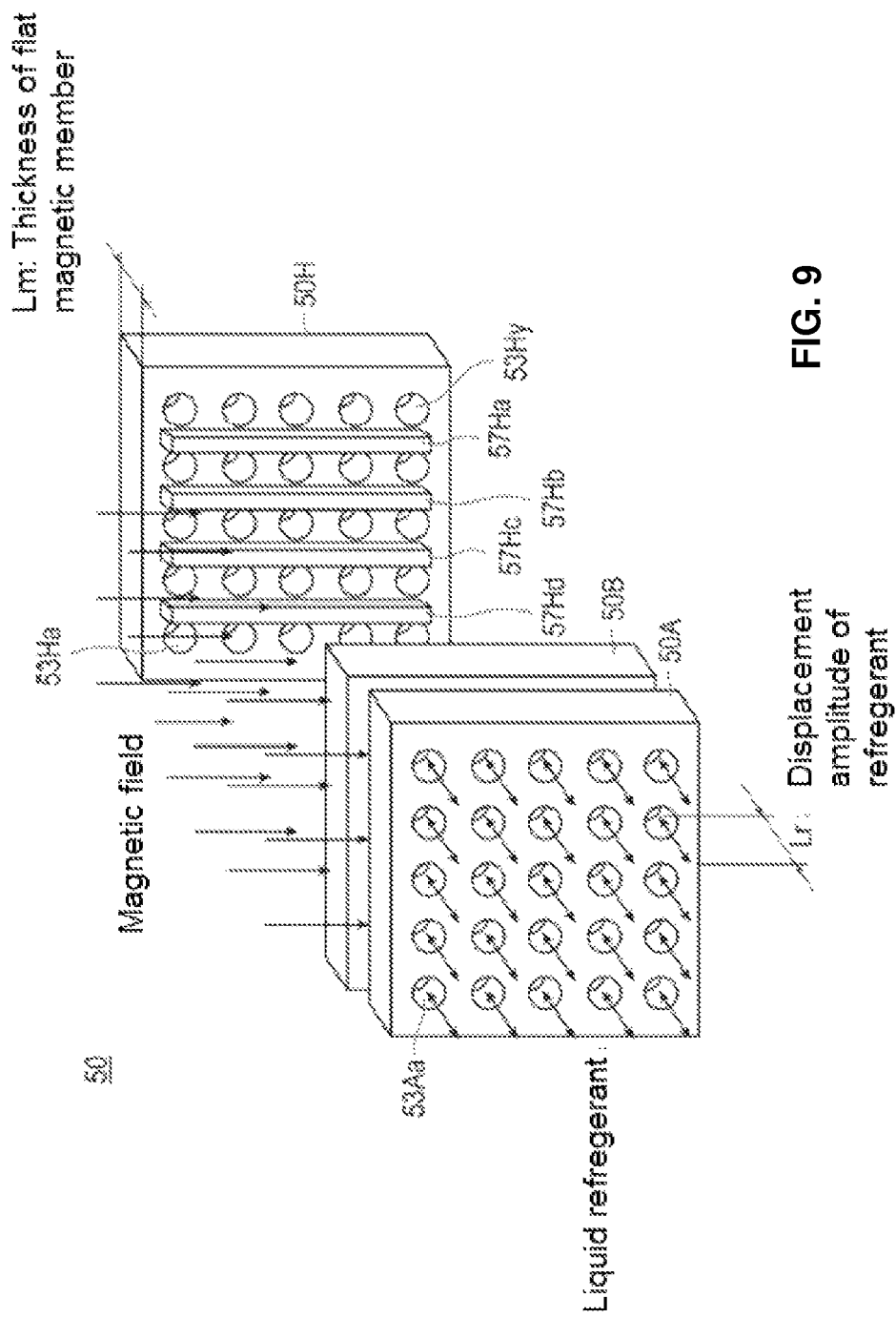
FIG. 9 is a block diagram of a magnetic material provided in the magnetic cooling and heating device in a fourth embodiment.

FIG. 9 is a configuration diagram provided in a magnetic air conditioning device in a fourth embodiment. Except for the structure of the engaging part, the other parts are constructed in the same manner with the magnetic body 50 shown in FIG. 7 are the same.

In the present fourth embodiment 4, eight flat magnetic members 50A . . . 50H are shown similarly in the first to third embodiments, depending on the heat transport capacity required for the magnetic air conditioning device, the magnetic body 50 is composed of at least one flat magnetic member.

The front and back sides of each of the plurality of the flat magnetic members 50A . . . 50H forming the magnetic body 50 are formed with engagement parts of square shape to make the adjacent magnetic members integral. The engaging parts are composed of engaging projections 57Ha . . . 57Hd of rectangular shape formed on one surface of the adjacent flat magnetic members 50A . . . 50H and engaging grooves (not shown) formed on the opposed surface into which the engaging projections 57Ha . . . 57Hd are mated.

On the one surface of the flat magnetic member 50H, engagement projections of squire shape, specifically of rectangular shape 57Ha . . . 57Hd are formed between the flow passages 53Aa . . . 53Ha . . . 53Hy. On the other hand, on the opposing surface of the flat magnetic member 50G (see FIG. 8) adjacent to the flat magnetic member 50H, between the flow passages, engaging grooves (not shown) to mate with the engaging projections 57Ha . . . 57Hd of rectangular shape of the flat magnetic member 50H.

These projection projections 57Ha . . . 57Hd of the flat magnetic member 50H are engaged with the engaging groove of the flat magnetic member 50G adjacent to the flat magnetic member 50 to form the integrated flat magnetic member 50G and flat magnetic member 50H. Even if the flat magnetic member 50G and the magnetic member 50H are integrated, a gap for circulating the liquid refrigerant 60 freely between the flat magnetic member 50H and the flat magnetic member 50G is formed.

As shown in FIG. 9, by forming the flow passage 53Aa . . . 53Ha . . . 53Hy of circular shape to each of the flat magnetic members 50A . . . 50H, the open end 51 of the flow passages 53Aa . . . 53Ha . . . 53Hy includes a leading edge effect described above with a dihedral or corner. The open end 51 of the flow passages 53Aa . . . 53Ha . . . 53Hy forms a leading edge portion and the heat exchange efficiency from the magnetic body 50 to the liquid coolant 60 is improved as described above.

According to the magnetic air conditioning device 100 in the present embodiment configured as described above, in addition to the same effect as the third embodiment, it is possible to further achieve the following effects.

Since both the engaging projections and mating grooves are shaped in a simple square, it is possible to easily perform the shaping of the flat magnetic members 50A . . . 50H.

When arranging the engagement projections of squire shape parallel to the direction of the magnetic field applied, as in the second embodiment shown in FIG. 6, more magnetic force lines are caused to pass through the flat magnetic members 50A . . . 50H. Therefore, it is possible to improve the magnetocaloric effect of the flat magnetic members 50A . . . 50H since the attenuation of the magnetic field is suppressed, to thereby increase the amount of heat generation and absorption of the flat magnetic members 50A . . . 50H.

In the first to fourth embodiments, when defining the thickness of the flat magnetic member 50A . . . 50H illustrated in FIGS. 3, 6, 7 and 9 as Lm while the movement amplitude (displacement distance) of the liquid refrigerant 60 in accordance with the reciprocal movement of the liquid refrigerant 60 as Lr, the liquid refrigerant 60 is caused to be move so as to meet the formula Lr≥2 Lm. In other words, by allowing the movement of the quantity of heat without stopping inside the flat magnetic member 50A . . . 50H, an effective transfer of calorific value may be performed effectively.

When the displacement amplitude of the liquid refrigerant 60 is too larger than the thickness of the flat magnetic member, high frequency becomes difficult and the improvement in the heat transfer efficiency will be limited. Therefore, it is preferable to adjust the magnitude Lr in accordance with the period of the reciprocal movement of the liquid refrigerant 60 while meeting the condition defined by Lr≥2 Lm.

Thus, by making the displacement amplitude of the liquid refrigerant 60 larger than the thickness of the flat plate magnetic member 50A . . . 50H, the heat exchange efficiency in the dihedral formed in the flow passage is improved. Therefore, the heat conversion efficiency of the magnetic body 50 is improved.

Further, in the first to fourth embodiments above, in the magnetic body 50 disposed in the heat exchanger 10, all the flat magnetic members 50A . . . 50H constituting the magnetic body 50 are formed of the same material. However, in order to improve the magnetocaloric effect as a magnetic body 50, it is preferable to arrange a flat magnetic member on the high-temperature side heat exchange portion 40A with a high magnetocaloric effect (with high temperature, entropy characteristic) in a high temperature condition will arranging a flat magnetic member at the low-temperature side heat exchange portion 40B with a high magnetocaloric effect (with low temperature, entropy characteristic), respectively. More specifically, in a direction from the flat magnetic member 50A adjacent to the high-temperature side heat exchanger portion 40A to the flat magnetic member 50H adjacent to the low-temperature side heat exchange portion 40B, arranging a flat magnetic member (for high temperature) that exhibits the magnetocaloric effect in a high temperature range, a flat magnetic member (for medium temperature) that exhibits the magnetocaloric effect in a medium temperature range, and a flat magnetic member (for low temperature) that exhibits the magnetocaloric effect in a low temperature range stepwise in this order, the difference in temperature between the high-temperature side heat exchange portion 40A and the low-temperature side heat exchange portion 40B may be further increased.

Thus, by placing the flat magnetic member having higher magnetocaloric effect (having high temperature entropy characteristic) under high temperature on the side of the high-temperature side heat exchange section 40A and placing the flat magnetic member having higher magnetocaloric effect (having low temperature entropy characteristic) under low temperature on the side of the low-temperature side heat exchange portion 40B, it is possible to take full advantage of the magnetocaloric effect of the magnetic body 50.

The invention claimed is:

1. A magnetic cooling and heating device comprising:
    a heat exchanger in which a magnetic body having a magnetocaloric effect is disposed;
    a magnetic field applying and removing unit to selectively apply and remove a magnetic field to and from the magnetic body; and
    a liquid refrigerant moving unit configured to move liquid refrigerant from a first end of the heat exchanger to a second end of the heat exchanger and from the second end to the first end to exchange heat with the magnetic body in the heat exchanger,
    wherein the magnetic body comprises at least one flat magnetic member having at least one flow passage extending through the magnetic member that opens in a direction perpendicular to a direction of movement of the liquid refrigerant,
    wherein the at least one flow passage includes at least one corner at an opening end and at least one corner at a portion of the flow passage other than the opening end, and
    wherein the at least one corner at the portion of the flow passage other than the opening end is offset from the at least one corner at the opening end in the direction perpendicular to the direction of movement of the liquid refrigerant.

2. The magnetic cooling and heating device as claimed in claim 1, wherein a plurality of flow passages are formed in the flat magnetic member and the plurality of flow passages open parallel to the magnetic field applied by the magnetic field applying and removing unit.

3. The magnetic cooling and heating device as claimed in claim 1, wherein a cross sectional shape along the direction of movement of the liquid refrigerant in the at least one flow passage having the at least one corner is configured to be line symmetrical with respect to a center line in a thickness direction of the flat magnetic member in a flow direction of the flat magnetic member or point symmetrical with respect to a center point of the flow passage of the center line.

4. The magnetic cooling and heating device as claimed in claim 1, wherein an engaging part is formed on front and back sides of the flat magnetic member to unite adjacent magnetic members.

5. The magnetic cooling and heating device as claimed in claim 1, wherein a relationship between a displacement distance Lr of a reciprocal movement of the liquid refrigerant and a thickness of the flat magnetic member in the direction of movement of the liquid refrigerant Lm is defined by Lr≥Lm.

6. A magnetic cooling and heating device comprising:
    a heat exchanger in which a magnetic body having a magnetocaloric effect is disposed;
    a magnetic field applying and removing unit to selectively apply and remove a magnetic field to and from the magnetic body; and
    a liquid refrigerant moving unit configured to move liquid refrigerant from a first end of the heat exchanger to a second end of the heat exchanger and from the second end to the first end to exchange heat with the magnetic body in the heat exchanger,
    wherein the heat exchanger comprises a high-temperature side heat exchange portion formed at one of the first end or the second end and a low-temperature side heat exchange portion formed at another of the first end or the second end,
    wherein the magnetic body comprises at least two flat magnetic members: a flat magnetic member having higher magnetocaloric effect in a high-temperature range at the high-temperature side heat exchange portion and a flat magnetic member having higher magnetocaloric effect in a low temperature range at the low-temperature side heat exchange portion,
    wherein the at least two flat magnetic members each have at least one flow passage extending through the respective magnetic member that opens in a direction perpendicular to a direction of movement of the liquid refrigerant, and
    wherein each flow passage includes at least one corner at an opening end and at least one corner at a portion of the flow passage other than the opening end.

* * * * *